(12) United States Patent  (10) Patent No.: US 7,515,618 B2
Franck  (45) Date of Patent: Apr. 7, 2009

(54) HIGH POWER LASER USING CONTROLLED, DISTRIBUTED FOCI JUXTAPOSED IN A STIMULATE BRILLOUIN SCATTERING PHASE CONJUGATION CELL

(75) Inventor: Jerome B. Franck, Alexandria, VA (US)

(73) Assignee: The United States of America as represented by the Department of the Army, Washington, DC (US)

( * ) Notice: Subject to any disclaimer, the term of this patent is extended or adjusted under 35 U.S.C. 154(b) by 367 days.

(21) Appl. No.: 11/024,445

(22) Filed: Dec. 30, 2004

(65) Prior Publication Data

US 2006/0146897 A1 Jul. 6, 2006

(51) Int. Cl.
*H01S 3/13* (2006.01)

(52) U.S. Cl. .............................. 372/30; 372/32; 372/9; 372/31; 372/29.023

(58) Field of Classification Search ...... 372/29.011–32, 372/9, 20, 21, 24, 25, 26, 13, 92
See application file for complete search history.

(56) References Cited

U.S. PATENT DOCUMENTS

| | | | | |
|---|---|---|---|---|
| 4,757,268 | A * | 7/1988 | Abrams et al. | 359/338 |
| 4,802,176 | A * | 1/1989 | O'Meara | 372/19 |
| 5,038,359 | A * | 8/1991 | Pepper et al. | 372/99 |
| 5,059,917 | A * | 10/1991 | Stephens | 359/347 |
| 5,504,763 | A * | 4/1996 | Bischel et al. | 372/33 |
| 5,910,857 | A * | 6/1999 | Scott et al. | 359/338 |
| 5,936,720 | A * | 8/1999 | Neal et al. | 356/121 |
| 6,069,730 | A * | 5/2000 | Injeyan et al. | 359/334 |
| 6,515,800 | B1 * | 2/2003 | Border et al. | 359/619 |
| 2004/0253549 | A1 * | 12/2004 | Ogusu | 430/322 |

OTHER PUBLICATIONS

Pulaski et al., "Measurement of aberrations in microlenses using a Shack-Hartman wavefront sensor," SPIE 2002 4767-07, pp. 1-9, Aug. 8, 2002.*

* cited by examiner

*Primary Examiner*—Minsun Harvey
*Assistant Examiner*—Xnning Niu
(74) *Attorney, Agent, or Firm*—John Raubitschek

(57) ABSTRACT

In the laser system of the present invention, an acoustic grating (AG) established in an SBS cell by an initial laser pulse is forced into oscillation from noise. Since the process is non-linear, SBS Phase Conjugation does not take place until a specific level is achieved based on several factors such as the physical conditions and the SBS media. The invention segments the initial laser pulse with a zonal lenslet array that produces a set of beams that have their foci distribute in space. By coupling this segmented lenslet array with a master lens, the separation of the foci from each other can be controlled. At a large separation distance each foci independently produces an associated AG. As each AG forms from a local noise source the coherence between the segmented beams has been lost. However, the master lens controls the entire focal envelope and hence the separation distance between the foci. Increasing the power of the master lens causes the separation between the foci to decrease. At some minimum distance the AG couple and hence the phase relationship is restored and coherence is re-established.

18 Claims, 7 Drawing Sheets

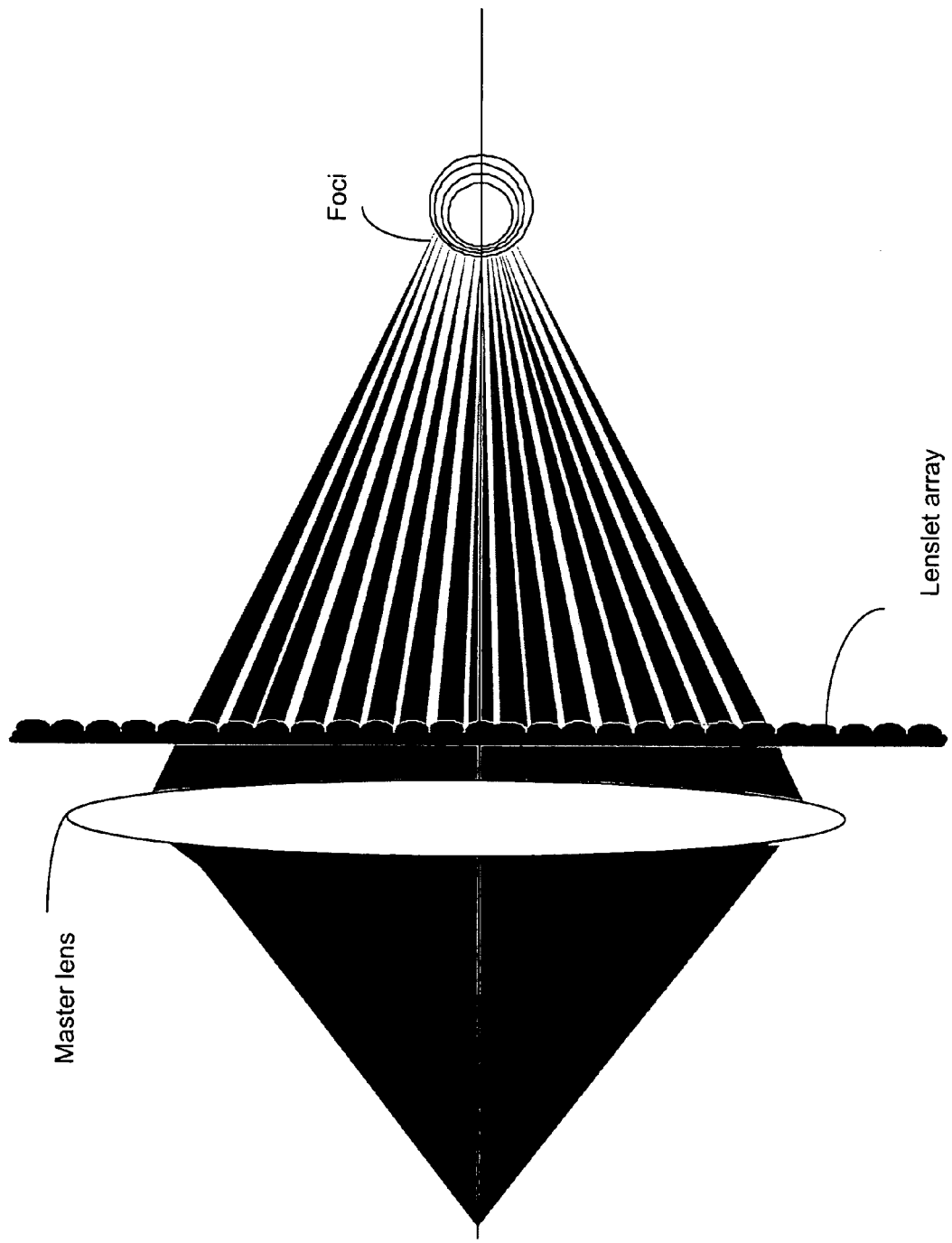

US 7,515,618 B2

HIGH POWER LASER USING CONTROLLED, DISTRIBUTED FOCI JUXTAPOSED IN A STIMULATE BRILLOUIN SCATTERING PHASE CONJUGATION CELL

CROSS-REFERENCE TO RELATED APPLICATIONS

The present application is related to co-pending application, U.S. Ser. No. 10/962,811 filed Oct. 7, 2004 by Jerome B. Franck and entitled, "Zonal Lenslet Array."

GOVERNMENT INTEREST

The invention described herein may be manufactured, used, sold, imported, and/or licensed by or for the Government of the United States of America.

FIELD OF INTEREST

This invention relates to a stimulated Brillouin scattering cell based high power laser and particularly to high power lasers having improved phase conjugation fidelity in beam output.

BACKGROUND OF THE INVENTION

Those skilled in the art of stimulated Brillouin scattering (SBS) for laser applications are well aware that once an initial laser pulse is formed by a laser source, the pulse becomes aberrated by any number of causes.

In order to correct for these aberrations or for atmospheric aberrations, laser systems have used SBS phase conjugation. Aberrations created in one direction are cancelled out by the reversing action of the optical phase conjugation. Attempts have been made to use this process for high power applications. However, the nature of the SBS process has fundamental limitations on the maximum power that can be put into the SBS cell and retain high quality phase conjugation fidelity.

The present invention overcomes this limitation and produces a laser output with high quality phase conjugation fidelity.

SUMMARY OF THE INVENTION

Accordingly, one object of the present invention is to produce a laser output with high quality phase conjugation fidelity.

This and other objects of the present invention are achieved by controlling the very nature of the SBS PC process.

In the process used in the present invention, an acoustic grating (AG) is forced into oscillation from noise. Since the process is nonlinear, SBS PC does not take place until a specific level is achieved based on several factors such as the physical conditions and the SBS media. However, as with any harmonic oscillator, the oscillations can be overdriven and once that takes place, the fidelity of the PC begins to degrade. (Usually in the tens of Joules) Distortions of the original wave front are returned along with the original, including angular errors. This invention addresses this issue by taking the whole laser beam and segmenting it with beam segmentation means such as a lenslet array that produces a set of beams that have their foci distribute in space within a region containing an SBS medium whether solid, liquid or gas. By coupling this segmented lenslet array with a master lens, the separation of the foci from each other can be controlled. At a large separation distance each foci independently produces an associated AG. As each AG forms from a local noise source the coherence between the segmented beams has been lost. However, the master lens controls the entire focal envelope and hence the separation distance between the foci. Increasing the power of the master lens causes the separation between the foci to decrease. At some minimum distance the set AGs couple and hence the phase relationship is restored and coherence is re-established.

The advantage of this arrangement is that foci, being separated in space now have distributed the energy over space as well in a 3-D sheet. By judicious choice of master lens, lenslet array focal lengths and number the system can handle very high power loads.

BRIEF DESCRIPTION OF THE DRAWINGS

These and other objects of the invention will become readily apparent in light of the Detailed Description of the Invention and the attached drawings wherein:

FIG. 7 shows a detail of the present invention along line A-A' of FIG. 6.

DETAILED DESCRIPTION OF THE INVENTION

Figure 1:
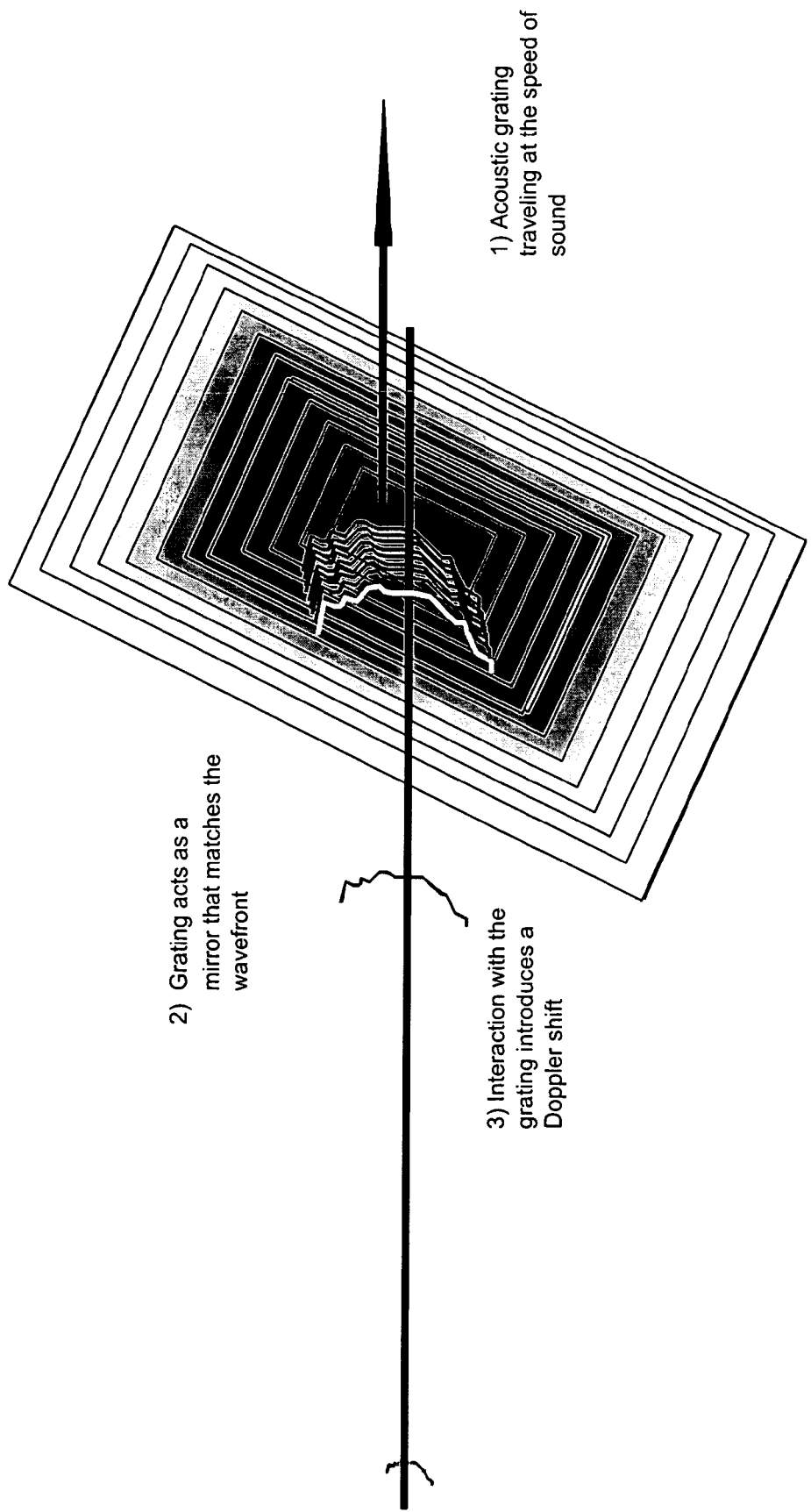
FIG. 1 is representation of an input pulse forming an acoustic grating in an SBS medium.

As those skilled in the art know an acoustic grating (AG) is formed in an SBS cell by a laser pulse traveling through the SBS media. The AG acts as a mirror that matches the wave front and the AG, traveling at the velocity of sound of the medium, introduces a Doppler shift. This is shown pictorially in FIG. 1. At this point the phase conjugated pulse is reflected and travels in the opposite direction at the speed of light in the medium. Concurrently, the AG begins to form upstream in the direction of the reflected pulse. This is the beginning of the AG, hence the PC mirror, and it forms upstream at close to the speed of light. This leading edge of the AG envelope may be thought of as moving mirror traveling in the direction of the reflected pulse and in the opposite direction of the incoming pulse.

Figure 2:
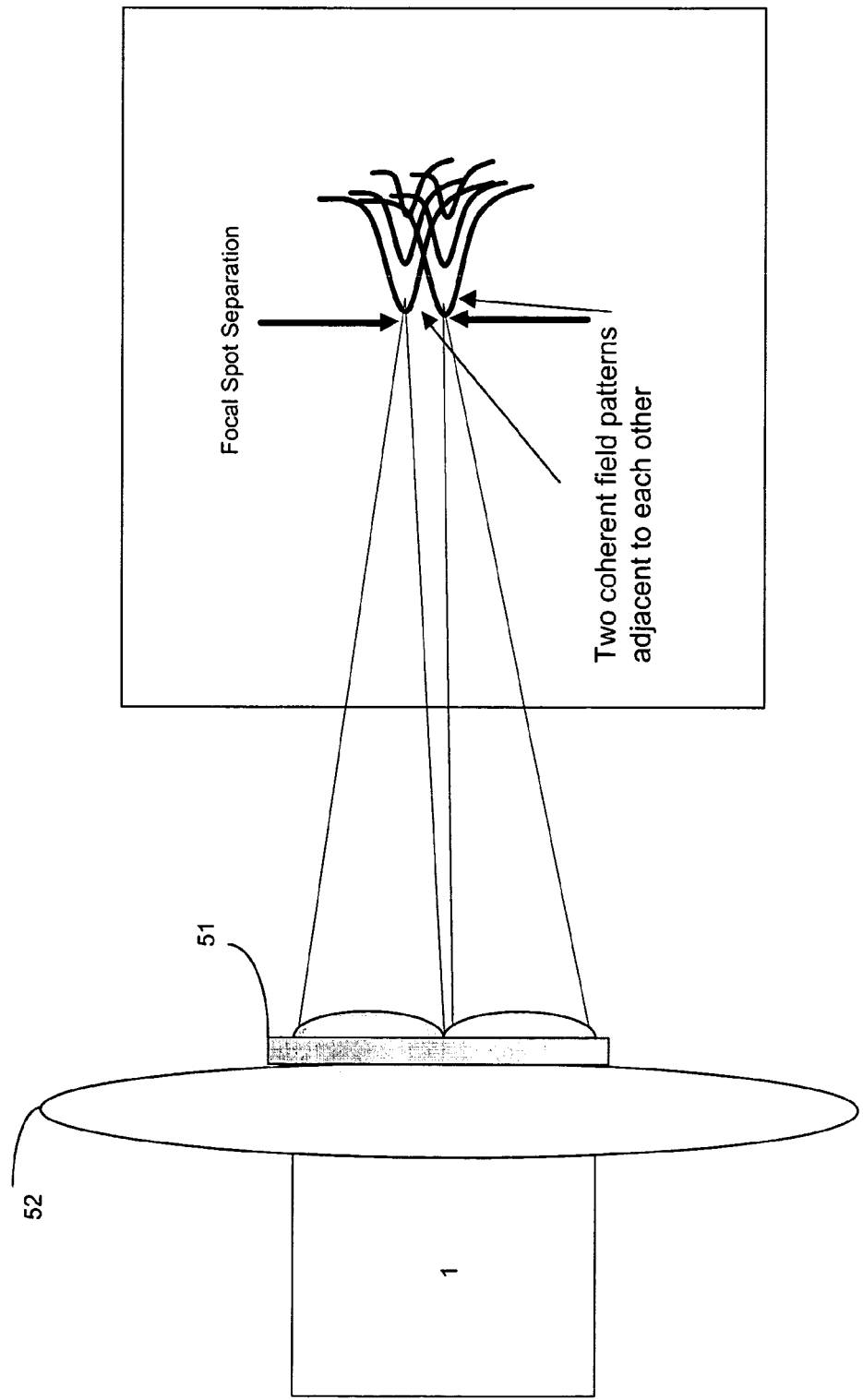
FIG. 2 shows one embodiment of the present invention wherein nominally 2 separate foci are formed from an optic having two lenslets.

The different foci can also be established from a single pulse 1 using at least two lens 51 disposed after a master lens 52, as shown in FIG. 2. As shown, the different foci of the incoming pulse establish to different field patterns.

Figure 3:
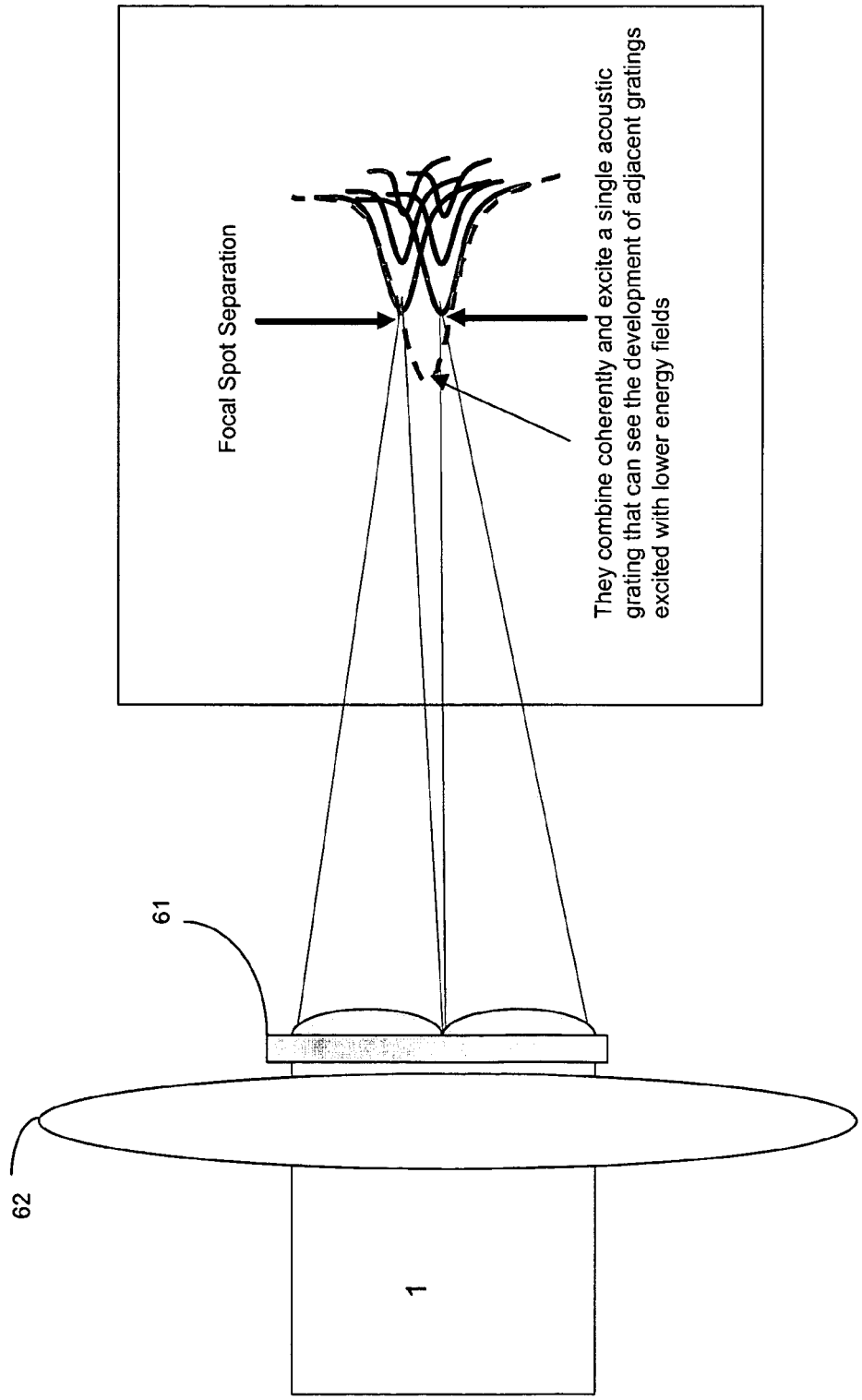
FIG. 3 shows the same embodiment of as in FIG. 5 but it shows how two coherent field patterns add to form a single stable acoustic grating.

In that process an acoustic grating (AG) is forced into oscillation from noise. Since the process is nonlinear, SBS PC does not take place until a specific level is achieved based on several factors such as the physical conditions and the SBS media. However, the oscillation can be overdriven and once that takes place, the fidelity of the PC begins to degrade. (Usually in the tens of Joules) Distortions of the original wave front are returned along with the original, including angular errors. This invention addresses this issue by taking the whole laser beam and segmenting it with a beam segmentation means such as a lenslet array that produces a set of beams that have their foci distributed in space. By coupling this segmented lenslet array by a master lens, the separation of the foci from each other can be controlled. At a large separation distance, each foci independently produces an associated AG. As each AG forms from a local noise source the coherence between the segmented beams has been lost. However, the master lens controls the entire focal envelope and hence the separation distance between the foci. Increasing the focal power of the master lens causes the separation between the foci to decrease. At some minimum separation distance the AG couple and hence the phase relationship is restored and coherence is re-established. This is shown in FIG. 3 where the two separately controlled foci combine coherently and excite a single acoustic grating. FIG. 3 also shows the development of adjacent gratings excited with lower energy fields.

Figure 4:
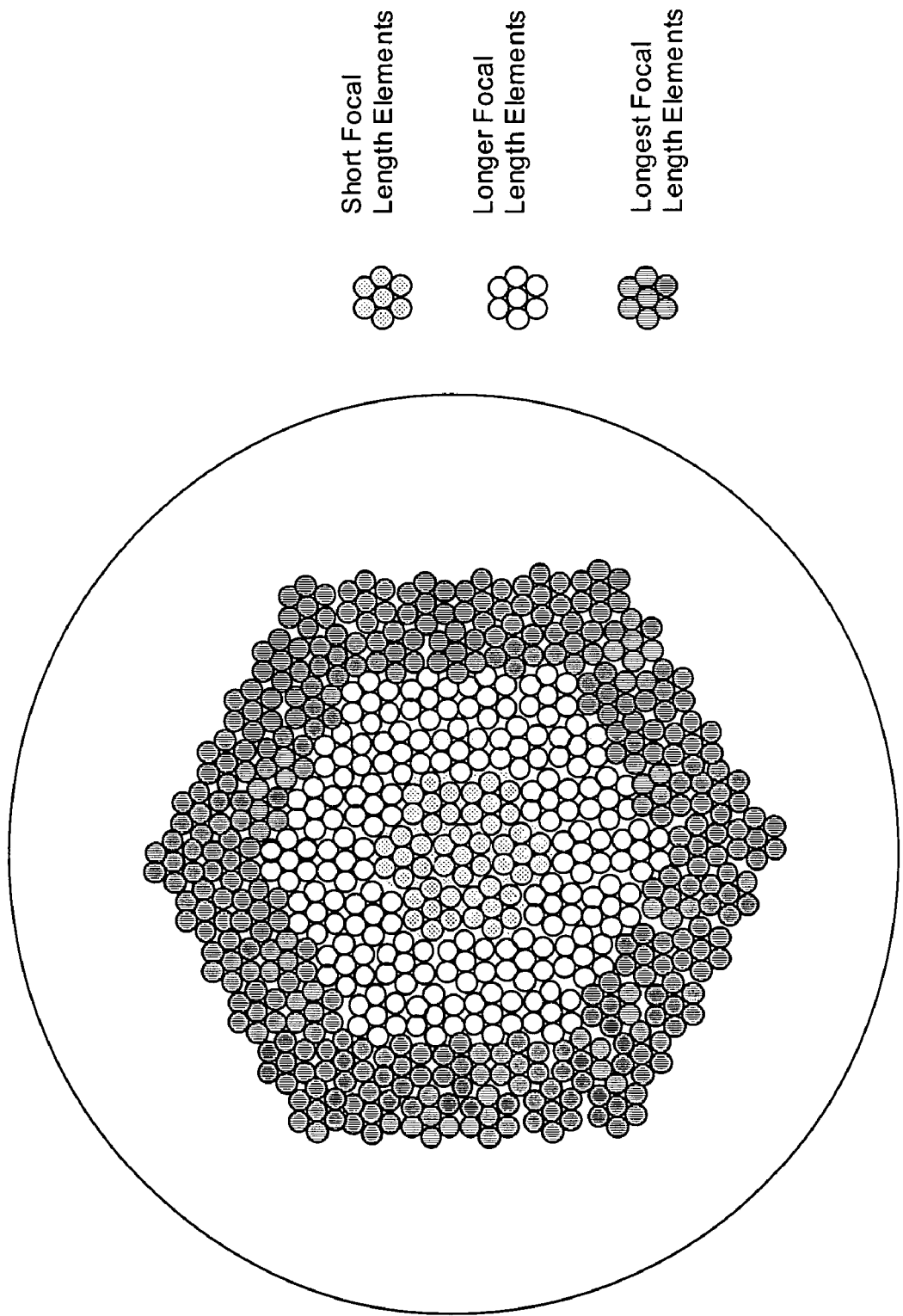
FIG. 4 shows a cross section view of a possible lenslet formation useful for the present invention.

FIG. 4 shows a front view of a lenslet array that would establish a multitude of foci that would establish an sample single 3-D profile or three dimensional distribution of foci. As shown, the shorter focal lengths are in the inner most section of the lenslet array and then the focal lengths get longer as they progress out toward the outer edges of the array.

Figure 5:
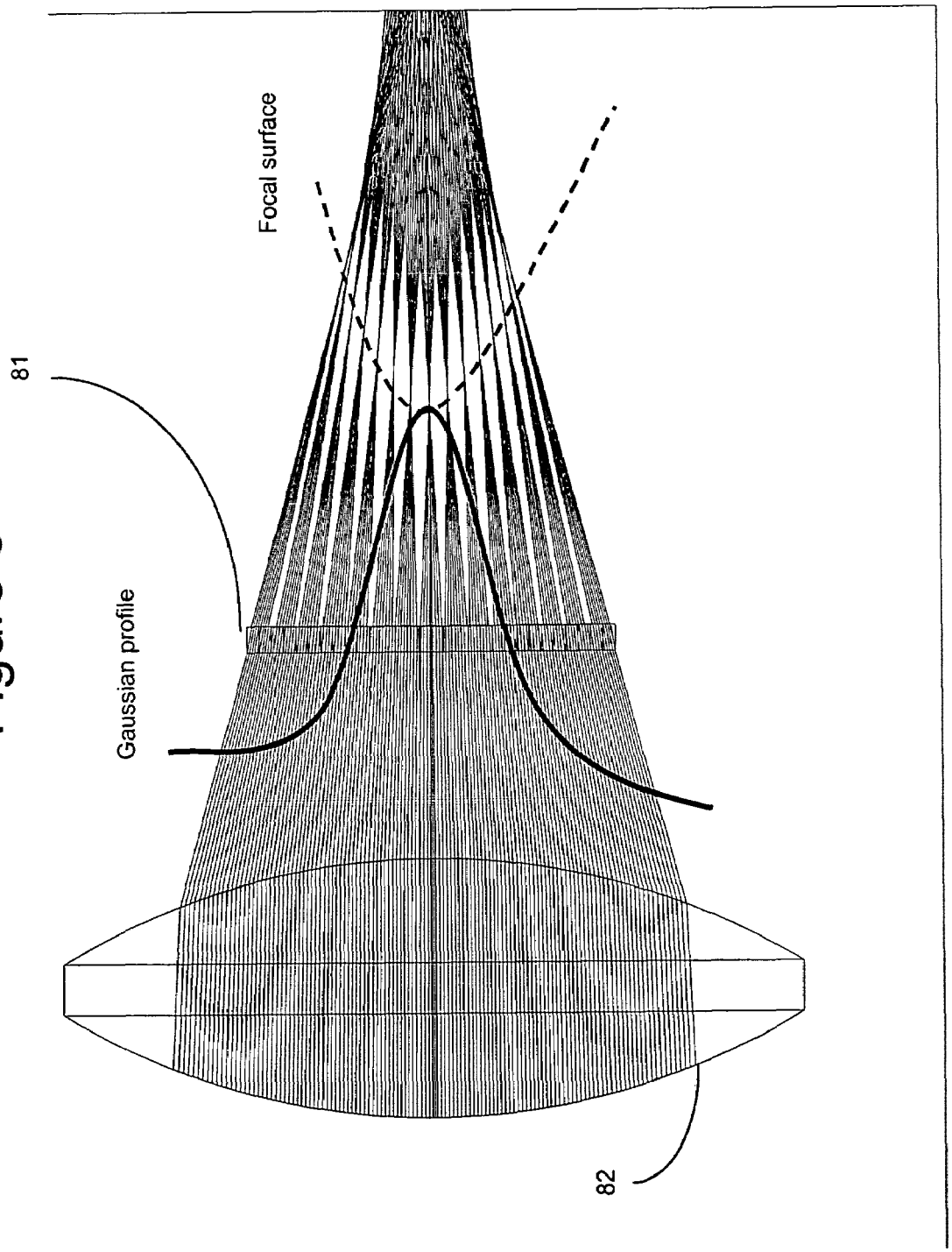
FIG. 5 shows a Zemax™ modeling of a preferred zonal lenslet array wherein the Gaussian profile of incoming input mirrors the focal surface established by the lenslet array.

The advantage of this arrangement is that foci, being separated in space now have distributed the energy over space as well in a 3-D sheet. By judicious choice of master lens, lenslet array focal lengths and number the system can handle very high power loads. FIG. 5 shows a Zemax™ model showing a preferred profile of foci wherein the Gaussian profile established by the foci mirrors the focal surface profile of the lenslet array.

Figure 6:
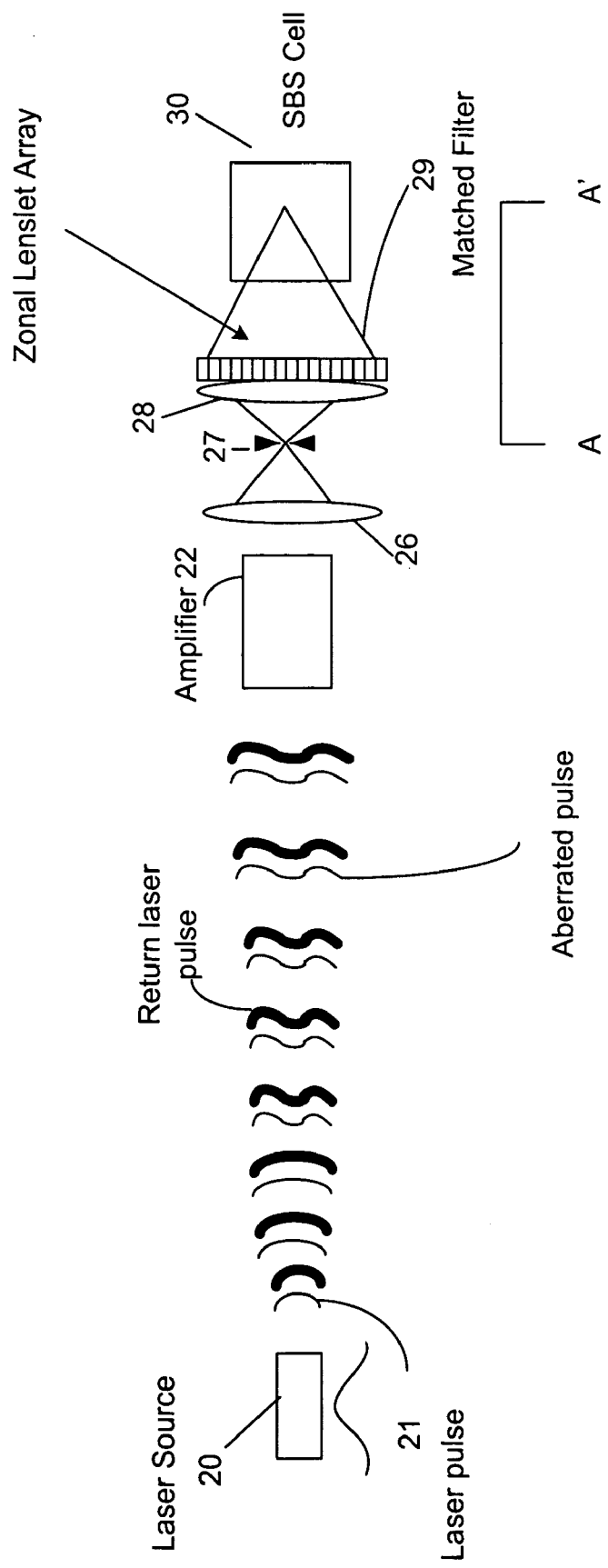
FIG. 6 is a schematic representation of a laser system in which the present invention would be useful.

As stated previously, the present invention would be particularly useful as a component in stimulated Brillouin scattering (SBS) laser configuration for lasers emitting radiation from the near UV to mid-band infrared wavelengths. Such a configuration is shown in FIG. 6. As shown, a SBS laser cell configuration comprises a shaping lens on an axis circular aperture followed by a higher power and a condensing lens followed by a zonal lenslet array according the present invention.

A laser 20 produces an initial laser pulse (beam). The output pulse (beam) exits the laser and becomes aberrated by any number of means. This is shown by the change in waveform.

Then, the aberrated pulse passes through an amplifying media and then through a matching filter with pinhole 27, which has a radius somewhat greater than the $1/e^2$ Gaussian radius of the incoming laser beam. The beam then leaves the matching filter 29 and the beam passes the second lens 28 of the matching filter that has a shaping power greater than the first lens 26 of the matching filter thus causing it to have a focus inside the SBS cell 30.

This converging beam now passes through the zonal lenslet array of the present invention. This breaks the incoming beam into sections, as shown in the previous figures, each with their own unique angle, yet all coming to an adjacent common focus and hence to a common SBS acoustic grating. This is critical so that all portions of the beam remain in phase with all other portions of the wave front in their original manner. Now, each SBS phase conjugated beam section re-enters the zonal lenslet array. Next, the total light from the beam passes through the second higher power lens 28 causing the beams to focus at the spatial filter. The higher spatial frequencies, associated with the beam sampling aperture of the lenslet array, are separated from the original beam by the spatial filter. FIG. 7 is a detail of the present invention along line A-A' showing how the zonal lenslet array focuses the initial pulse to have a minimal separation of the foci.

As stated previously because at a minimum separation distance, the AGs couple and hence the phase relationship is restored in the SBS cell. This then re-establishes the coherence of the pulse. Accordingly, because the separately controlled foci combine coherently, a single extended acoustic grating is formed and the pulse is reflected from the SBS cell via this single AG. The power of return pulse, however, is amplified by the gain of the amplifier 22 with the exact conjugate of the aberrated waveform of the initial pulse. The aberrations then are corrected in opposite to the initial pulse thereby resulting in a coherent amplified return pulse.

Those skilled in the art will appreciate that the present invention has applications for high power laser systems. Given this disclosure, those skilled in the art would be able to configure many different types of laser applications using the zonal lenslet array according to the present invention. Because this system is novel, those skilled in the art would have to devise beam shaping simulators that could take into account the plurality of the foci created by the zonal lenslet array to achieve the optimal combined coherence of the pulse.

What is claimed is:

1. A laser source comprising:
    a laser that produces an output laser pulse;
    a Stimulated Brillouin Scattering (SBS) cell;
    a master lens with a predetermined power; and
    a zonal lenslet array to segment the output laser pulse that produces a set of beams that have their foci distribute in space, focusing the output laser pulse into the SBS cell;
    wherein the power of the master lens is sufficient to control the distribution of foci such that acoustic gratings formed from the segmented output laser in the SBS cell are coupled and a phase relationship and coherence is established.

2. The laser source of claim 1 wherein the zonal lenslet array establishes a three dimensional distribution of foci.

3. The laser source of claim 1 wherein the master lens controls the entire focal envelope and hence the separation difference between the foci.

4. The laser source of claim 3 wherein a Gaussian profile is established by the segmented output laser pulse and the Gaussian profile mirrors the distribution of foci.

5. The laser source of claim 1 further comprising an optical element, which provides angular discrimination to the laser pulse.

6. The laser source of claim 1 further comprising an amplifier that amplifies a return laser pulse from the SBS cell by the gain of the amplifier means with the exact conjugate of a waveform of the output laser pulse.

7. The laser source of claim 1 further comprising a first lens and pin hole which has a radius greater than a $1/e^2$ Gausian radius of the laser pulse, wherein the first lens, pin hole, and master lens form a spatial filter.

8. A method of producing a laser pulse comprising the steps of:
    producing an output laser pulse;
    providing a Stimulated Brillouin Scattering (SBS) cell;
    providing a master lens with a predetermined power;
    segmenting the initial output laser pulse with a zonal lenslet array thereby producing a set
    of beams that have their foci distribute in space; and
    focusing the output laser pulse into the SBS cell;
    wherein the power of the master lens is sufficient to control the distribution of foci such that acoustic gratings formed from the segmented output laser pulse in the SBS cell are coupled and a phase relationship and coherence is established.

9. The method of claim 8 wherein the zonal lenslet array establishes a three dimensional distribution of foci.

10. The method of claim 8 wherein the master lens controls the entire focal envelope and hence the separation difference between the foci.

11. The method of claim 10 wherein a Gaussian profile is established by the segmented output laser pulse and the Gaussian profile mirrors the distribution of foci.

12. The method of claim 8 further comprising an optical element, which provides angular discrimination to the laser pulse.

13. The method of claim 8 further comprising the step of amplifying a return laser pulse from the SBS cell by the gain of the amplifier means with the exact conjugate of a waveform of the laser pulse.

14. The method of claim 8 further comprising the step of providing a first lens and pin hole which has a radius greater than a 1/e2 Gausian radius of the laser pulse, wherein the first lens, pin hole, and master lens form a spatial filter.

15. A laser source comprising:
   a laser that produces an output laser pulse;
   a Stimulated Brillouin Scattering (SBS) cell;
   a master lens with a predetermined optical power wherein the master lens is designed to controls the entire focal envelope and wherein a Gaussian profile is established by the output laser pulse and the Gaussian profile mirrors the distribution of foci;
   an optical element to provide angular discrimination to the laser pulse: and
   means to segment the output laser pulse that produces a set of beams that have their foci distribute in space, focusing the output laser pulse into the SBS cell;
   wherein the means to segment is a zonal lenslet array;
   wherein the zonal lenslet array establishes a three dimensional distribution of foci; and
   wherein the optical power of the master lens is sufficient to control the distribution of foci such that acoustic gratings formed from the segmented output laser in the SBS cell are coupled and a phase relationship and coherence is established.

16. A method of producing a laser pulse comprising the steps of:
   producing an output laser pulse;
   providing a Stimulated Brillouin Scattering (SBS) cell;
   providing a master lens with a predetermined optical power wherein the master lens is designed to control the entire focal envelope and hence the separation distance between the foci produced by segmenting elements and wherein a Gaussian profile is produced in a predetermined manner;
   providing an optical element to provide angular discrimination to the laser pulse;
   segmenting the initial output laser pulse thereby producing a set of beams that have their foci distributed in space;
   wherein segmenting the initial output laser is done by a zonal lenslet array and wherein the zonal lenslet array establishes a three dimensional distribution of foci;
   and focusing the output laser pulse into the SBS cell;
   wherein the optical power of the master lens is sufficient to control the distribution of foci such that acoustic gratings formed from the segmented output laser pulse in the SBS cell are coupled and a phase relationship and coherence is established.

17. The laser source of claim 15 farther comprising a first lens and pin hole which has a radius greater than a $1/e^2$ Gausian radius of the laser pulse, wherein the first lens, pin hole, and master lens form a spatial filter.

18. The method of producing a laser pulse of claim 16 further comprising the step of providing a first lens and pin hole which has a radius greater than a $1/e^2$ Gausian radius of the laser pulse, wherein the first lens, pin hole, and master lens form a spatial filter.

* * * * *